July 31, 1934.  V. G. APPLE  1,968,591
BRAKE AND STARTER CONTROL MECHANISM
Filed Jan. 23, 1930  2 Sheets-Sheet 2

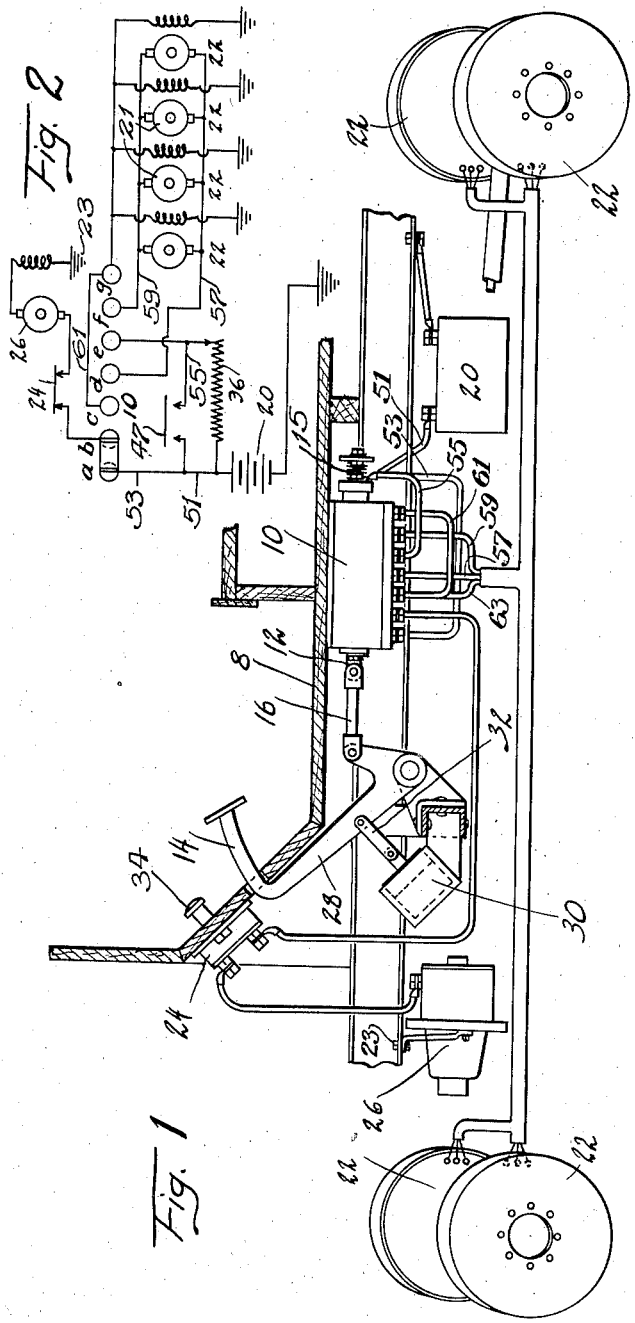

INVENTOR.
Vincent G. Apple
BY
Burton & McConkey
ATTORNEYS.

Patented July 31, 1934

1,968,591

UNITED STATES PATENT OFFICE 1,968,591

BRAKE AND STARTER CONTROL
MECHANISM

Vincent G. Apple, Dayton, Ohio, assignor to Bendix Brake Company, South Bend, Ind., a corporation of Illinois Application January 23, 1930, Serial No. 422,748

15 Claims. (Cl. 188—162)

My invention relates to a control mechanism for automotive vehicles and has particular reference to the starting of the vehicle engine and the retardation of the vehicle.

One object of my invention is to provide automatic control of the above specified functions with the least possible physical effort on the part of the vehicle operator.

At the same time it is an object of my invention to so interconnect and correlate my automatic means for accomplishing the various functions to be performed as to eliminate confusion on the part of the operator or jamming of the various parts by virtue of accidental simultaneous operation thereof.

More specifically an object of my invention is to utilize in an electric starter and brake control system, brake applying means capable of providing a positive release of the brakes rather than a mere permitting of their release, and I have illustrated for this purpose an electric system whereby a reversible electric motor may be rotated in one direction or the other to apply or release the brakes.

Another object of my invention is to automatically control the period during which this positive release of the brakes occurs, thereby insuring the proper position of the various brake parts when in their inoperative position.

Still other objects and meritorious features of my invention will become apparent from the description taken in conjunction with the drawings wherein like numerals refer to like parts throughout the several figures and wherein:

Fig. 1 represents a somewhat diagrammatical view of an automotive vehicle equipped with my control mechanism, Figs. 2, 3, and 4 are circuit diagrams illustrating various phases of my control.

Figure 6:
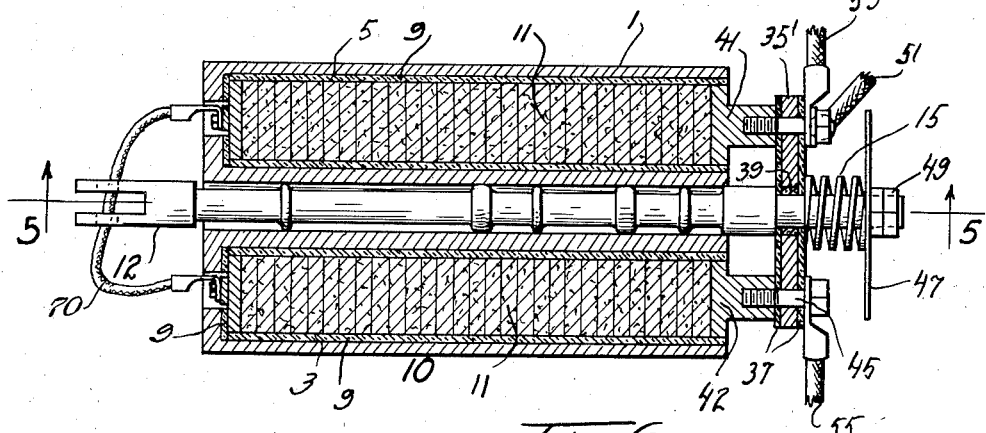
Fig. 6 is a section along 6—6 of Fig. 5.
Figure 5:
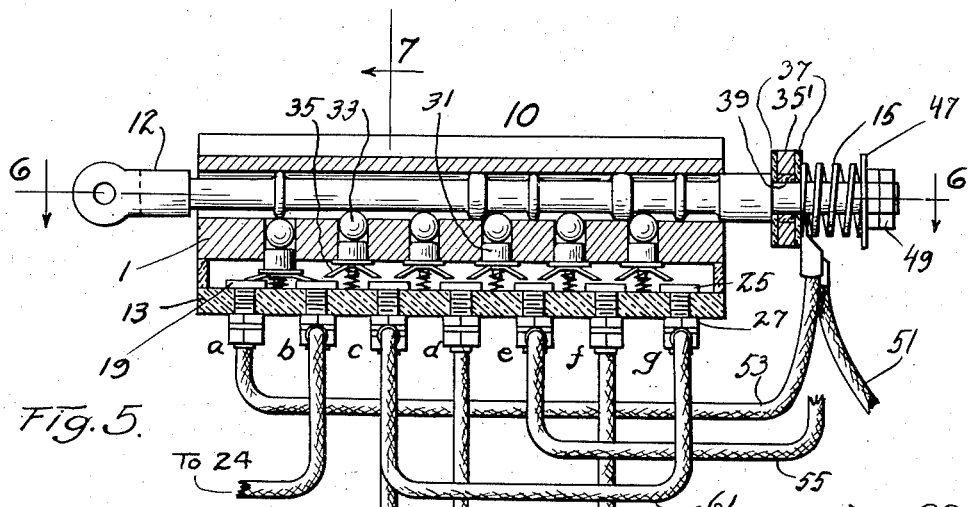
Fig. 5 is a sectional elevation through the electric controller unit.
Figure 7:
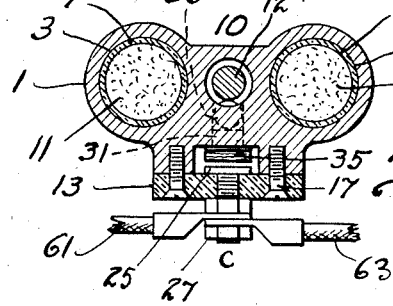
Fig. 7 is a vertical section through the controller.

Secured to any convenient portion of the vehicle 8 is an electric control member which I have here illustrated generally by the numeral 10. A similar electric control member is described and claimed in detail in my co-pending application Serial No. 421,328, filed January 16, 1930. This control member has an axially slidable rod 12 mounted therein and to this rod brake pedal 14 is connected through the link 16.

The controller 10 includes a housing 1 through which the cam rod 12 is axially slidable. The housing is divided into a pair of tubular compartments 3 and 5, each of which is provided with a lining of insulation as indicated at 7 and 9. Each tubular compartment is provided with a pile of carbon discs 11 which are insulatively connected with one another by lead 70. An insulating plate 13 is secured to the housing 1 by means of screws 17 and a plurality of longitudinally spaced terminals extend through said insulation plate into a contact region indicated by the numeral 19. The terminals have been represented respectively as a, b, c, d, e, f, and g. Each of the terminals includes a plate 25 which screws into and through the insulation plate 13, which plates are clamped by nuts 27 which also function to secure terminal lugs on the extremities of electric cables.

The switch elements per se include plug members 31 which are movable by balls 33 to force switch blades 35 downwardly to bridge the various contact plates. The camming surfaces on the cam rod 12 are so designed that predetermined blades will bridge predetermined pairs of contact plates in any desired order.

A plate 35' insulated through plates 37 and a bushing 39 from the cam rod 12 is connected to plungers 41 and 42 through bolts 45. A plate 47 is conductively connected to cam rod 12 by nuts 49. This plate holds spring 15 in position and functions as a short circuit switch against the bolts 45.

One terminal of a conventional storage battery 20 is connected to the controller 10 as illustrated in the diagram and the other terminal grounded on the frame. Various terminals of the controller 10 are connected up as indicated to reversible electric motors 21 which are secured to the backing plates, or some other conventional portion, of the brake assemblies 22. I have not illustrated these motors, except diagrammatically in Figs. 2–4, inasmuch as no part of my invention resides therein and they are described in detail in my copending application, now Patent No. 1,876,541, September 13, 1932.

One terminal of the starter switch 24 is connected up with the starting motor 26 which is also grounded on the frame as at 23.

Figure 8:
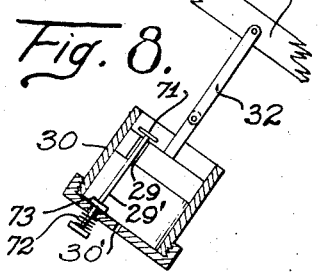
Fig. 8 is a detailed view, partly in section, of my dashpot control mechanism for the brake pedal.

Secured in any convenient manner to a cross frame member of the chassis and in the same vertical plane with the brake pedal stem 28 is a dashpot 30. The piston of this dashpot is connected by means of a pivoted link 32 with the said pedal stem 28. There is illustrated in Figure 8 one manner of dashpot control which checks the return movement of the brake pedal adjacent full release position. The piston is provided with an aperture 29 through which extends a valve stem 29' provided with a valve 71 adapted to seat on the aperture as the piston reciprocates to its upper position. The spring 72 interposed between the head of the stem and the dashpot cylinder insures that the valve is positively seated on the aperture 29. Stop element 73 is provided on the stem to prevent the latter from reciprocating to the full extent of the piston's reciprocation. The small aperture 30' allows air to slowly enter the dashpot when the valve has closed the aperture 29 adjacent full release position of the brake pedal allowing the latter to move relatively slowly thereafter. As the rod 12 is pulled axially through the member 10 when pressure is exerted upon the brake foot pedal 14, it closes various switches. In this particular instance the initial movement of the rod 12, through depression of the brake pedal, functions to connect the braking motors in circuit in such a way that they will run in a direction to release the brakes.

In Fig. 2 I have illustrated the circuit as it exists when the brake pedal is withdrawn, thereby placing the contacts in the controller member 10 in a position to permit a circuit through electric starting motor 26, and the starting pedal 34 has been depressed to close the starting switch 24, thereby actually closing the circuit through the starting motor for the purpose of cranking the engine. As clearly indicated in the circuit diagrams the pedal 14 must be undepressed to permit a circuit through starting motor 26.

Under these circumstances the electric circuit goes from the ground to the battery 20, from the battery through lead 51 and jumper 53 to contact plate a, across to plate b, and from there to the starting switch 24 of the electric starting motor 26 and thence through the ground 23 to the battery.

Fig. 3 illustrates the circuit after slight depression of the brake pedal 14. This slight depression brings about the initial movement of the axially slidable rod 12 to open the circuit through the starting motor and close the circuit through the electric brake motors, causing them to rotate in the direction to positively release the said brakes.

Under these circumstances the circuit will be as follows: Current will come from the ground to the battery, from the battery through lead 51 to the plug 41 and thence through the carbon piles 11, designated resistance 36 in the diagrammatic figures, back to plug 45, thence across the jumper 55 to contact plate e, across to plate d and out through lead 57 to the electric brake motors 21 and return through lead 59 to contact plate f, across to plate g, back through jumper 61 to plate c and on to ground through lead 63.

In this direction of circuit the electric brake motors, as hitherto explained, will operate in a direction to release the brakes. It will be noted from the diagrammatic Figs. 2-4 that the coil of each of the electric brake motors is independently grounded.

However, on further depression of the brake pedal 14 rod 12 is drawn axially still further through the controller member 10 causing shifting of the switches therein to create the circuit illustrated in Fig. 4 of my drawings. This further depression of the brake pedal and its accompanying reaction in the controller member 10 reverses the circuit and causes the electric brake motors to rotate in a direction for applying the brakes.

The circuit during application of the brakes, as stated, is illustrated in Fig. 4. It will be apparent that if the cam rod 12 is drawn axially through the controller casing 1 plugs 41 and 43 will be constrained to follow and the carbon discs 11 will be compressed with greater force to lower the resistance as the brake pedal is further depressed. The circuit for actuating the brakes is in the reverse direction from that illustrated in Fig. 3 and is as follows: from ground to battery and through lead 51, through the resistance 36 (carbon piles 11) as in the case of Fig. 3. From there it goes through jumper 55 to plate e, across to plate f, and thence through the lead 59 to the electric motors 21, back to plate d through lead 57, across to plate c, and directly out through ground lead 63.

On further depression of the brake pedal 14 the plate 47 will short circuit the resistance 36 by contacting with bolts 45 and the full amount of current will flow through the motors for braking purposes.

As already brought out, the varying resistance created in the controller member 10 as the rod is slid axially therethrough, gradually decreases. This is illustrated diagrammatically in Figs. 2 to 4 by including different amounts of the resistance 36 in the various circuits.

It is to be observed that depression of pedal 14 and movement of rod 12 in a forward direction is resisted at all times by spring 15. The pedal actuating mechanism is therefore yieldably urged at all times toward its inoperative, or released, position. Furthermore, the effort required of the vehicle operator to depress the pedal increases gradually as the limit of pedal movement is approached. When the pressure on the brake pedal 14 is released it is withdrawn by means of spring 15, as well as an ordinary retraction spring (not shown), but the dashpot control catches the said pedal on its re-bound just before it comes to rest. The time period occupied by the pedal in returning from the position in which it is caught by the dashpot to its normal inoperative position is controlled by the dashpot. During this period the circuit through the electric brake motors is in the direction to positively release the brakes. In this way a definite predetermined release action is automatically insured.

Various other modifications of my device may be apparent to those skilled in the art and for that reason I intend to limit myself only within the scope of the appended claims.

I claim:

1. Vehicle control mechanism comprising brakes, a brake pedal, reversible electric motors adapted to apply and release the brakes, means whereby slight depression of the brake pedal closes a circuit to release the brakes, and means whereby further depression of the brake pedal reverses the circuit to apply the brakes.

2. Vehicle control mechanism comprising brakes, a brake pedal, reversible electric motors adapted to apply and release the brakes, means whereby slight depression of the brake pedal closes a circuit to release the brakes, means whereby further depression of the brake pedal reverses the circuit to apply the brakes, and means automatically controlling the period for reversing and releasing the brakes.

3. Vehicle control mechanism comprising brakes and a brake pedal, power means operable to apply said brakes on normal depression of the pedal, means automatically responsive to the full release of manual effort applied to the pedal to positively release the brakes, and means effective during the last part only of the pedal release movement for automatically controlling the period of positive release action.

4. Vehicle control mechanism comprising brakes, a brake pedal, a reversible electric motor coupled with said brakes to apply or release them depending upon its direction of rotation, means whereby slight depression of the pedal closes a circuit through the motor in release direction, said means including means for reversing the circuit on further depression of the pedal, and means for automatically controlling the period of motor rotation in the release direction on withdrawal of pressure from the brake pedal.

5. Vehicle control mechanism comprising brakes, a brake pedal, an electric motor for each of the brakes adapted to apply or release the same according to its direction of rotation, means whereby initial depression of said brake pedal closes a circuit through said motors in release direction, means whereby further depression of said pedal reverses said circuit, and means whereby further depression of the brake pedal after said initial depression automatically decreases the resistance in said circuit.

6. Vehicle control mechanism comprising brakes, a brake pedal, an electric motor for each of the brakes adapted to apply or release the same according to its direction of rotation, means whereby initial depression of said brake pedal closes a circuit through said motors in release direction, means whereby further depression of said pedal reverses said circuit, means whereby further depression of the brake pedal after said initial depression automatically decreases the resistance in said circuit, and means whereby the period during which the releasing circuit is closed upon withdrawal of pressure from the brake pedal is automatically controlled.

7. In a vehicle having a brake, a manually operable member controlling the application of the brake, means for withdrawing said member on release of manual effort therefrom, mechanism regulating the last portion of the release movement of said member, and means operable only during said regulated release of said member adapted to release the brakes.

8. Control mechanism for a vehicle having a brake, a starting motor, a starting motor pedal, a brake pedal, a source of power, and a controller responsive to the starting motor pedal and to the brake pedal to permit delivery of power from the source of power to operate the starting motor and to actuate the brake respectively.

9. Control mechanism for a vehicle having a brake comprising a reversible electric motor controlling the brake, a starting motor, and a single controller responsive to manual applying members to regulate both of said motors.

10. Brake mechanism including, in combination, brakes, power means coupled therewith for applying and releasing the brakes, a manually operable control member associated with said power means for controlling the same, and means coupled with said manually operable means for resisting movement in one direction.

11. Brake mechanism including, in combination, brakes, power means coupled therewith for applying and releasing the brakes, a manually operable control member associated with said power means for controlling the same, and means coupled with said manually operable means for resisting movement in one direction for a portion only of its movement in such direction.

12. Control mechanism of the class described including, in combination, brakes, electric power means coupled therewith for applying and releasing the same, variable control mechanism for said power means, a manually operable member coupled with said control mechanism operable to energize the power means, and means coupled with said manually operable member operable on release movement thereof only to determine the period of release energization of the electric power means.

13. Vehicle brake mechanism including, in combination, brakes, power means adapted to apply and release said brakes, a control mechanism for said power means, a manually operable member coupled with said control mechanism for actuating the latter, said control mechanism adapted to cause said power means to release said brakes upon full release of said manual operable member after brake application.

14. Vehicle brake mechanism including, in combination, brakes, power means adapted to apply and release said brakes, a control mechanism for said power means adapted to regulate said power means to either apply or release the brakes, a manual operable member resiliently constrained in an inoperative position, connections between said member and said control mechanism adapted to actuate the latter upon movement of the former, said control mechanism adapted to regulate said power means to release said brakes upon movement of said member adjacent its inoperative position.

15. Brake mechanism including, in combination, brakes, a manually operable control member for applying said brakes, yieldable means connected with said control member for returning said control member to an inoperative position upon manual release thereof, and a dashpot coupled with said member adapted to retard the return movement of said control member just before the control member attains its inoperative position.

VINCENT G. APPLE.